(12) United States Patent
Grabowski et al.

(10) Patent No.: US 6,811,197 B1
(45) Date of Patent: Nov. 2, 2004

(54) HOUSING ASSEMBLY FOR ELECTRICAL ENERGY STORAGE DEVICE

(75) Inventors: Tony Gary Grabowski, Sterling Heights, MI (US); Arun Kumar Jaura, Canton, MI (US); Jaswant S. Dhillon, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/065,743

(22) Filed: Nov. 14, 2002

(51) Int. Cl.[7] ................................................. B60R 7/00
(52) U.S. Cl. .................. 296/37.8; 180/68.5; 180/89.11; 224/902
(58) Field of Search ............................... 296/37.1, 37.8, 296/37.12, 37.13, 37.14, 37.15, 37.16; 224/906, 400, 275, 829, 902; 180/68.5, 89.11, 89.1

(56) References Cited

U.S. PATENT DOCUMENTS

| | | | |
|---|---|---|---|
| 3,993,378 A | * 11/1976 | Berkus ..................... 296/24.1 |
| 4,169,191 A | 9/1979 | Alt et al. | |
| 4,317,497 A | 3/1982 | Alt et al. | |
| 4,355,695 A | * 10/1982 | Leskovec .................. 180/68.5 |
| 5,060,748 A | * 10/1991 | Iwai et al. ................. 296/37.1 |
| 5,293,951 A | * 3/1994 | Scott ......................... 180/68.5 |
| 5,378,555 A | 1/1995 | Waters et al. | |
| 5,392,873 A | 2/1995 | Masuyama et al. | |
| 5,434,494 A | 7/1995 | Perego | |
| 5,441,123 A | 8/1995 | Beckley | |
| 5,534,364 A | 7/1996 | Watanabe et al. | |
| 5,593,793 A | 1/1997 | German | |
| 5,639,571 A | 6/1997 | Waters et al. | |
| 5,736,272 A | 4/1998 | Veenstra et al. | |
| 6,109,380 A | 8/2000 | Veenstra | |
| 6,130,003 A | 10/2000 | Etoh et al. | |
| 6,186,256 B1 | * 2/2001 | Dignitti ..................... 180/68.5 |
| 6,264,260 B1 | * 7/2001 | Kronner et al. .......... 296/37.15 |
| 6,497,441 B1 | * 12/2002 | Mahmood et al. ......... 296/37.8 |
| 2002/0021015 A1 | * 2/2002 | Kronner et al. .......... 296/37.15 |
| 2003/0047366 A1 | * 3/2003 | Andrew et al. ............ 180/68.5 |
| 2004/0016580 A1 | * 1/2004 | Kronner et al. ............ 180/68.5 |

* cited by examiner

Primary Examiner—Lori L. Coletta
(74) Attorney, Agent, or Firm—Carlos L. Hanze

(57) ABSTRACT

A housing assembly for an electrical energy storage device includes a support structure arranged within a passenger compartment of a vehicle, a combined housing/console structure for concealing, at least partially, the support structure and the electrical energy storage device, and a housing cover, having at least one console feature, for mounting on the housing/console structure.

15 Claims, 9 Drawing Sheets

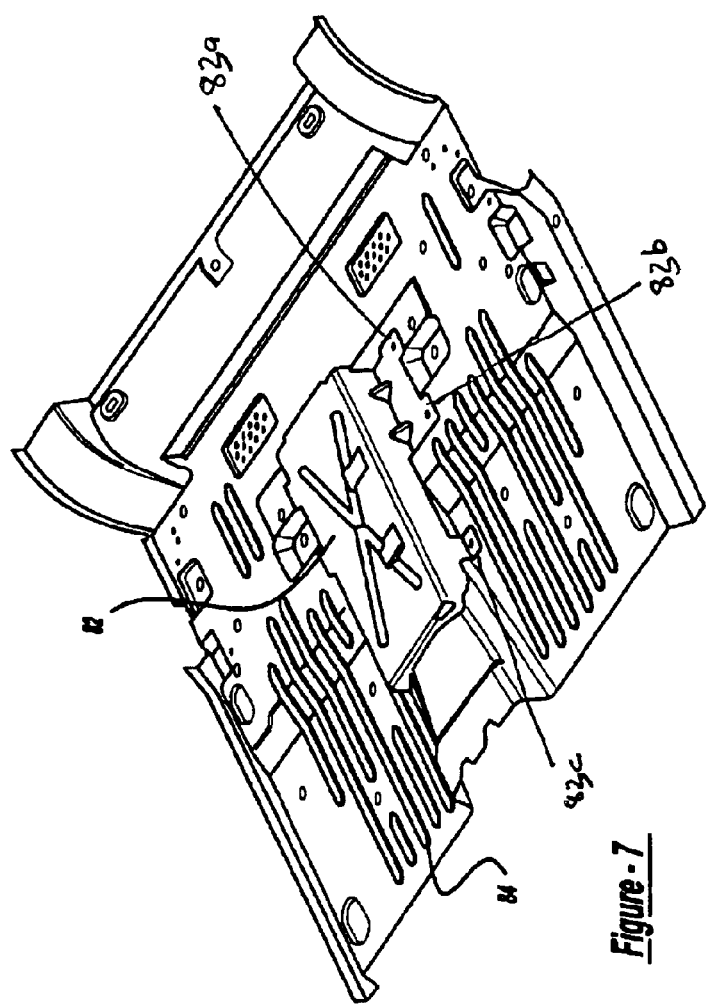

HOUSING ASSEMBLY FOR ELECTRICAL ENERGY STORAGE DEVICE

BACKGROUND OF INVENTION

1. Field of the Invention

The present Invention relates generally to housing assemblies for batteries and equivalent electrical energy storage devices. More particularly, the invention relates to a battery housing assembly that efficiently utilizes available cabin space within an automotive vehicle.

2. Background Art

Future automotive vehicles, including for example hybrid electric and fuel cell powered vehicles and the like, will include an increasing number of electrical vehicle features and loads. Such features for example may include telecommunications systems ("telematics"), 110V outlets, "instant" heating, integrated starter/generators, power electronics, battery and electronics cooling, and other advanced electrical features. To meet the increased electrical demands of these features, some vehicles will utilize a separate high voltage bus, e.g., a 42-volt, 150-volt or 300-volt, in combination with a conventional low voltage 14-volt bus. Alternatively, other vehicles will utilize a single high voltage power bus from which lower voltages are derived using a DC-to-DC converter. Still others may require ultra-capacitors or other equivalent electrical energy storage devices. In any event, such vehicles will require additional electrical energy storage capabilities to meet increasing demands for electrical power.

The need for additional electrical energy storage capability thus raises the problem of where and how to package additional electrical energy storage devices within a vehicle. This problem is further complicated by the need to minimize vehicle weight, improve fuel economy, and include additional power-consuming systems and components. U.S. Pat. No. 5,736,722 to Veenstra et al., which is owned by the assignee of the present invention and which is hereby incorporated by reference in its entirety, for example describes an electric vehicle battery tray assembly that enables a standard battery pack to be configured in a variety of ways to allow more efficient packaging of the battery pack. The battery tray includes a modular battery separator assembly, which provides a "flexible" mechanism for stacking rows of individual batteries. Other patents show a battery pack integrated as part of an electric vehicle structure, see for example U.S. Pat. No. 5,378,555 to Waters et al., and a battery unit disposed under the seat of an electrically powered lift truck, see for example U.S. Pat. No. 4,355,695 to Leskovec.

As such, the inventors herein have recognized the need for efficiently packaging additional or larger electrical energy storage devices on-board automotive vehicles. This is a formidable challenge given the demand for additional vehicle features and the need to minimize vehicle weight and improve fuel economy.

SUMMARY OF INVENTION

An assembly is provided that functions both as a housing for an electrical energy storage device, such as a battery, ultra-capacitor or even fuel cell, and as a console assembly in a vehicle passenger compartment. In accordance with a preferred embodiment, the assembly includes a support structure disposed within the vehicles passenger compartment for supporting the electrical energy storage device, a combined housing/console structure for concealing, at least partially, the support structure and the electrical energy storage device, and a housing cover, having at least one console feature, for mounting on the combined housing/console structure. The housing assembly is especially useful in automobiles, but can also be adapted for use in boats, planes and other types of vehicles.

In accordance with another preferred embodiment specifically adapted for automotive application, an automobile battery housing assembly is provided having a battery support structure disposed within the passenger compartment, at least one battery unit mounted on the battery support structure, a combined battery housing/console structure for concealing, at least partially, the battery support structure and the at least one battery unit, and a housing cover, having at least one console feature, for mounting on the combined battery housing/console structure.

Advantageously, the battery housing assembly described herein allows for the efficient packaging of additional or larger or even spare batteries within an automotive vehicle. In a hybrid sport utility vehicle for example, the present invention allows for retention of vehicle features, such as a third row seating, auxiliary air conditioning, larger cargo space and underbody spare tire storage, that would otherwise be sacrificed due to the placement of a high voltage battery pack elsewhere within the vehicle.

Further advantages, objects and features of the invention will become apparent from the following detailed description of the invention taken in conjunction with the accompanying figures showing illustrative embodiments of the invention.

BRIEF DESCRIPTION OF DRAWINGS

For a complete understanding of the present invention and the advantages thereof, reference is now made to the following description taken in conjunction with the accompanying drawings in which like reference numerals indicate like features and wherein:

FIG. 3b is a perspective view showing the accessory support structures of FIG. 3a;

FIG. 7 is a perspective view of another support structure in accordance with another preferred embodiment of the present invention.

DETAILED DESCRIPTION

Figure 1:
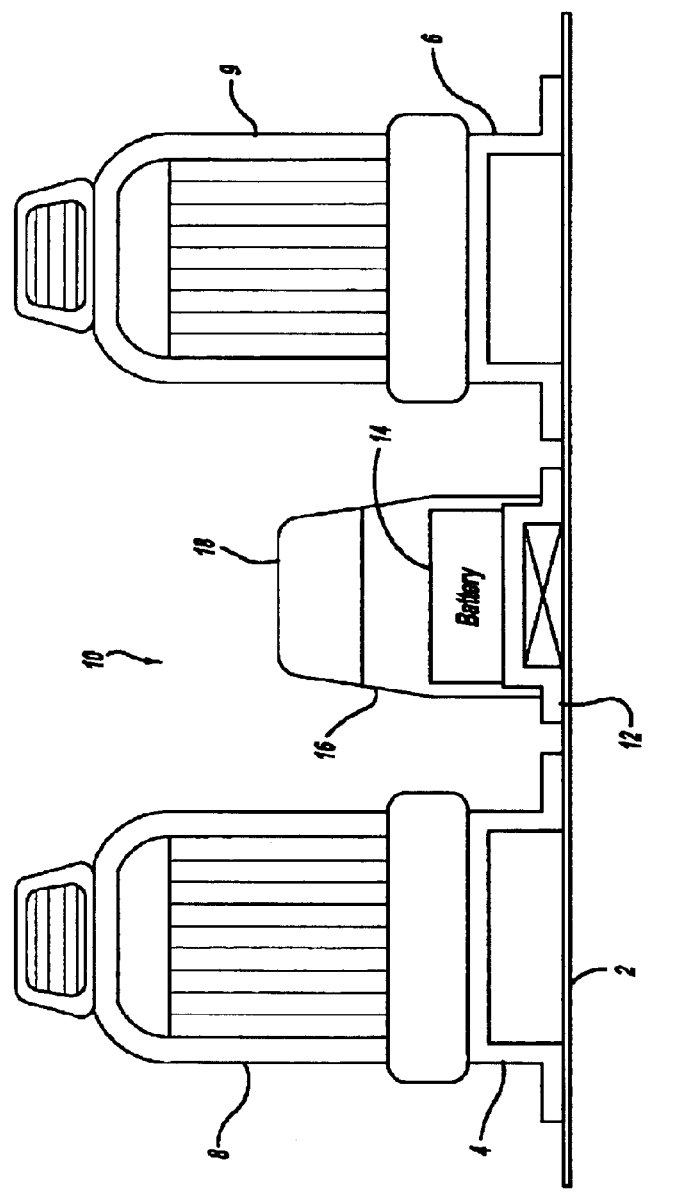
FIG. 1 is a schematic diagram of an automobile battery housing assembly in accordance with preferred embodiment of the present invention.

The invention described herein is a housing assembly for storing an electrical energy storage device, such as a battery, within a passenger compartment of a vehicle. In accordance with a preferred embodiment as shown in FIG. 1, a battery housing assembly 10 is integrally disposed as a console assembly within an automobile passenger compartment. The invention is especially useful in vehicles having dual battery systems such as hybrid electric vehicles having a conventional 14-volt bus and a secondary high voltage bus. The invention described herein, however, can be used in any automotive vehicle, including but not limited to hybrid electric, electric and fuel cell vehicles. The invention can also be constructed and adapted for use on other types of vehicles, such as boats, planes and other forms of transportation.

As shown in FIG. 1, the battery housing assembly 10 is disposed between passenger seats 8 and 9 and seat supports 4 and 6, preferably but not limited to second or third row seats of an automotive vehicle. A rigid support structure 12, preferably constructed out of metal or plastic, is affixed to a vehicle frame member 2 and provided for supporting one or more battery units 14 (only one shown). A combined battery housing/console (base) structure 16 fits over the battery units 14, and is affixed either to the frame member 2, support structure 12 or both. The battery housing/consoles 16, which is preferably made of plastic or a vinyl material, includes a top portion (not shown) that can be completely open, or partially or even completely enclosed as shown for example by housing/console 62 in FIG. 3. Referring again to FIG. 1, a housing cover 18 is provided to fit over the top portion of the battery housing 16.

Figure 2A:
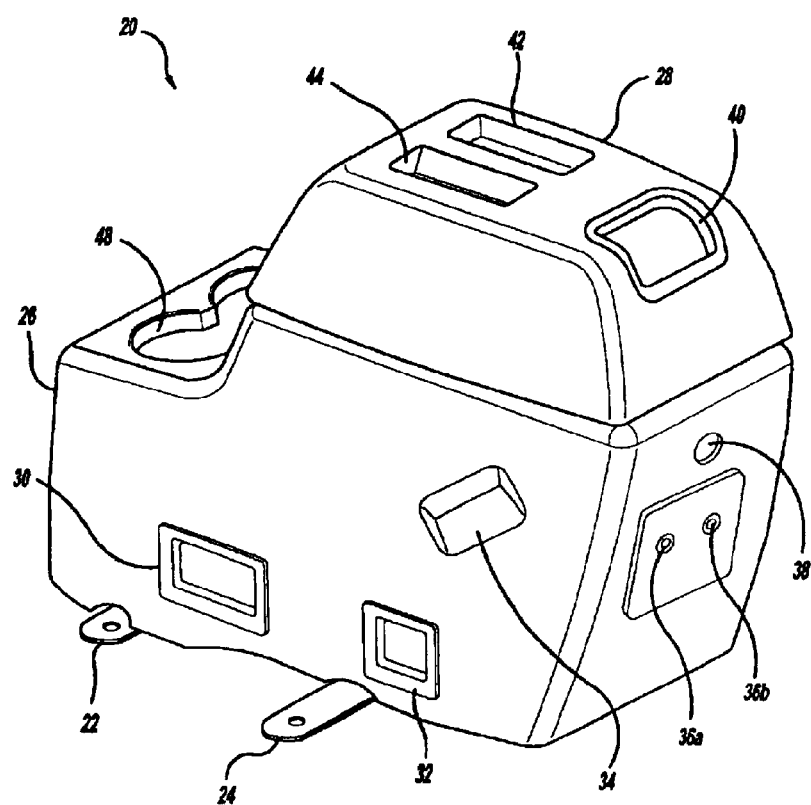
FIGS. 2a and 2b are perspective views of an exemplary automobile battery housing assembly in accordance with the present invention.
Figure 2B:
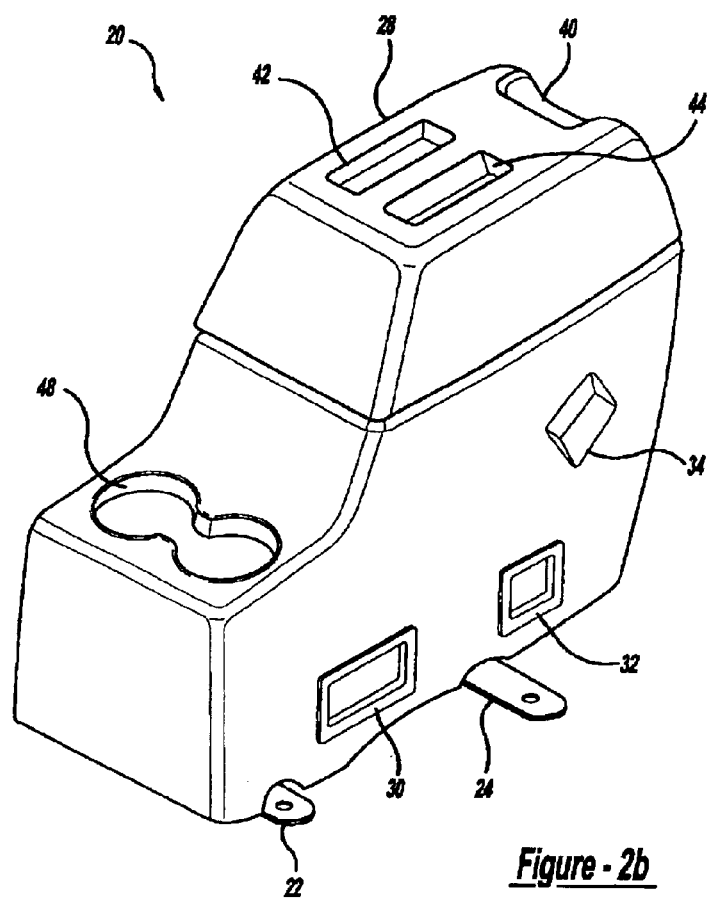

FIGS. 2a and 2b show perspective views of an exemplary automobile battery assembly 20 in accordance with the present invention. A support structure, of which portions 22 and 24 are shown, is constructed for mating onto a vehicle floorpan. Alternative embodiments of the support structure are described below with reference to FIGS. 6 and 7.

Referring again to FIGS. 2a and 2b, one or more battery units (not shown) are arranged on the support structure and concealed, at least partially, by a combined battery housing/console structure 26. The housing/console structure 26 can be enclosed on the top side, as shown for example in FIG. 3, or open for improved ventilation. Preferably, the housing/console structure 26 is bolted directly to the vehicle floorpan or frame (not shown), or to the support structure itself. The housing/console structure 26, as further shown in FIGS. 2a and 2b, includes ventilation structure 32 (only one shown), seat clearance region 34 and outlet/power point 38 (e.g., a 110-volt or 12-volt outlet). The ventilation structure 32 can be a grill, screen, meshed opening or the like for providing additional ventilation for the assembly 20.

Next, a housing cover 28 is affixed to the top of the housing/console 26, and is arranged and constructed to provide one or more console features to vehicle occupants. Preferably, the housing cover 28 is suitably arranged and constructed so as to snap-on to the housing console 26. "Console features," by way of example and not limitation, may include armrests, cup holders, baby bottle holders, CD/video/game cartridge holders, change slots and various other types of slots and holders, and accessory support structures or platforms. The housing cover 28 of FIGS. 2a and 2b for example includes slot/holders 42 and 44. The housing cover 28, however, may also include headphone jacks, game ports, power outlets and charger units for cell phones, cameras and other electropic devices.

The console features may also be included as part of the housing/console structure 26, as shown for example by cup holders 48, headphone jacks 36a and 36b, and 110V outlet 30. Accessory support structures, for example as shown by reference numerals 66 and 68 in FIGS. 3a and 3b, can be attached directly to the console structure, or alternatively, to the console cover.

Referring again to FIGS. 2a and 2b, housing cover 28 also includes a region 40, which can be a ventilation structure or screen or meshed opening or the like for providing additional ventilation for the assembly 20. The region 44 can also be adapted to function as a handle for easy removable of the housing cover 28 from the battery housing/console structure 26. As such the housing cover 28, which is preferably designed to be removable and interchangeable with other similar covers, can be removably attached for ease of accessing and servicing the battery units. Removal of the housing cover 28 provides access to hidden service panel to service the battery, if needed. The cover 28, as well as the housing/console structure 28, can be made in multiple colors and finishes to suit the customer's taste. The cover 28 alternatively can be in the form of a flat platform or surface that can be used to play board games, place a laptop or other electronic device.

Figure 3B:
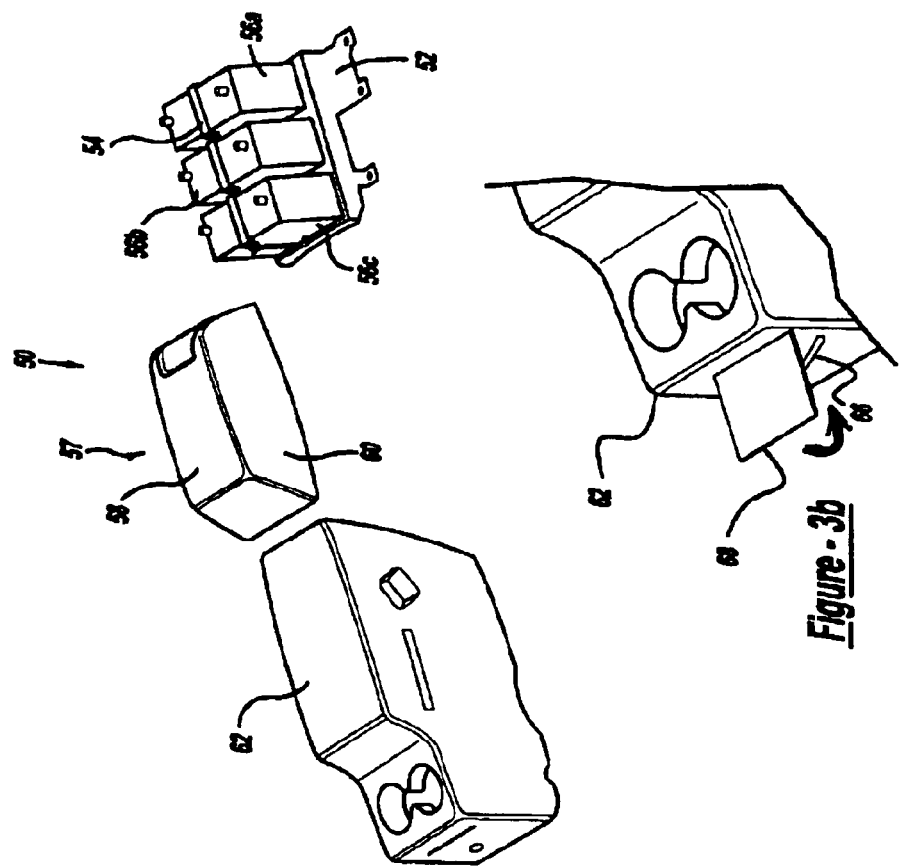
Figure 3A:
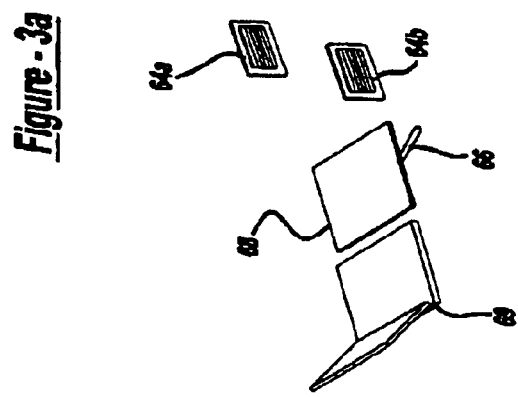
FIG. 3a is an exploded perspective view of another exemplary automobile battery housing assembly In accordance with the present invention.

FIG. 3a shows another preferred embodiment 50 of the present invention, which includes a housing cover 57 constructed and arranged to function as an armrest, storage compartment 60 and support structure 66, 68 for a portable DVD player 69. The housing cover 57 includes a lid 58 for accessing storage compartment 60 and an assembly 66,68 for supporting a DVD player or other portable electronic equipment. The assembly 66,68, as shown in FIG. 3b, is designed to fold down in the direction of the arrow to be flush with the front side of the battery housing/console structure 62, or to detach or slide in and out of the battery housing/console structure 62.

The battery housing assembly of FIG. 3a further includes a metal or plastic base 52 for supporting a high voltage battery pack, e.g., a 42-volt battery pack. As shown, the battery pack is segmented into three individual battery units 56a, 56b and 56c. Grills 64a, 64b are provided over ventilation openings on the battery housing/console structure 62.

Figure 4:
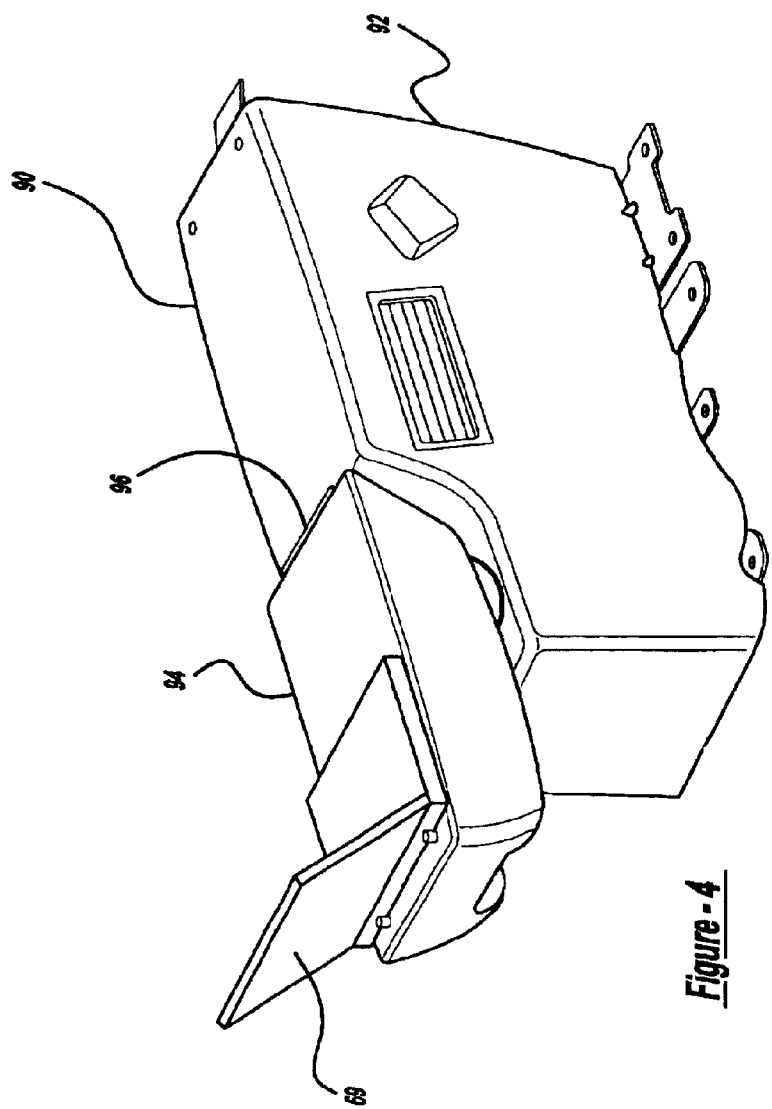
FIG. 4 is a perspective view of another exemplary automobile battery housing assembly in accordance with the present invention.

Alternatively, as shown in FIG. 4, another preferred embodiment 90 of the present invention includes a housing cover 94 attached to a housing/console 92 via a hinge 96. The hinge 96, which is fixed or formed into the front top edge of the housing/console 92, allows the housing cover 94 to fold from a nominal position (for example as shown by housing cover 28 in FIGS. 2a and 2b) to an extended position as shown in FIG. 4. In the extended position, the housing/cover serves as a support platform, i.e., an accessory support structure, for portable DVD player 69, laptop or other portable electronic device. Preferably, the housing cover 94 also includes a fixed or removable platform or retainers arranged on the flat surface of the housing cover 94 for fastening the DVD player 69, laptop or other portable electronic device during operation of the vehicle. The housing cover 94 also includes a storage compartment for storing, for example, the DVD player 69 and other accessories or devices.

Figure 5A:
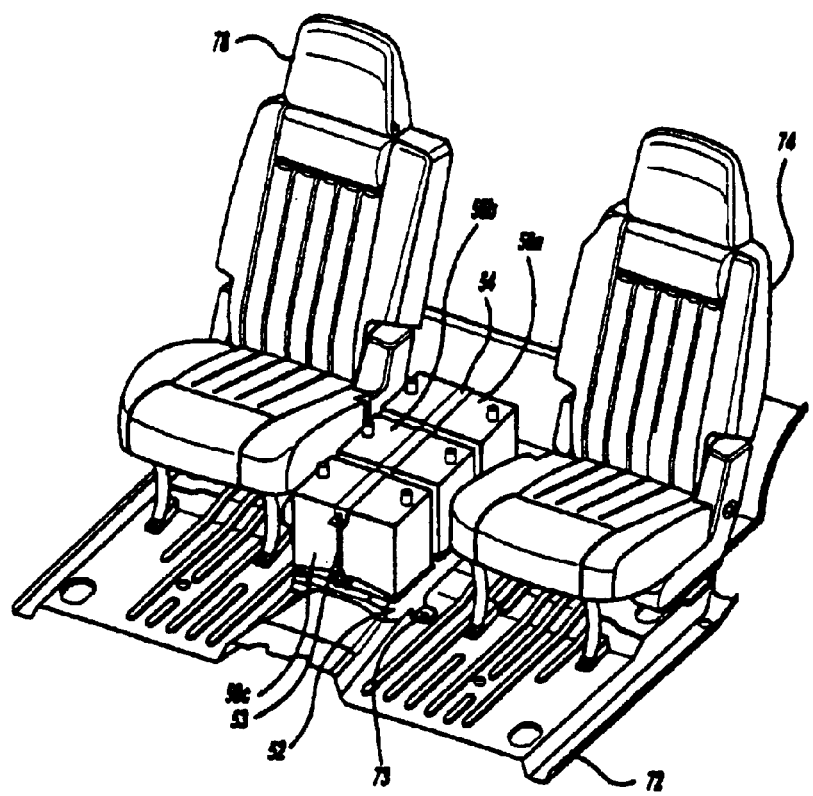
FIGS. 5a and 5b are perspective views of the automobile battery housing assembly of FIG. 3a disposed within a passenger compartment of an automobile.
Figure 5B:
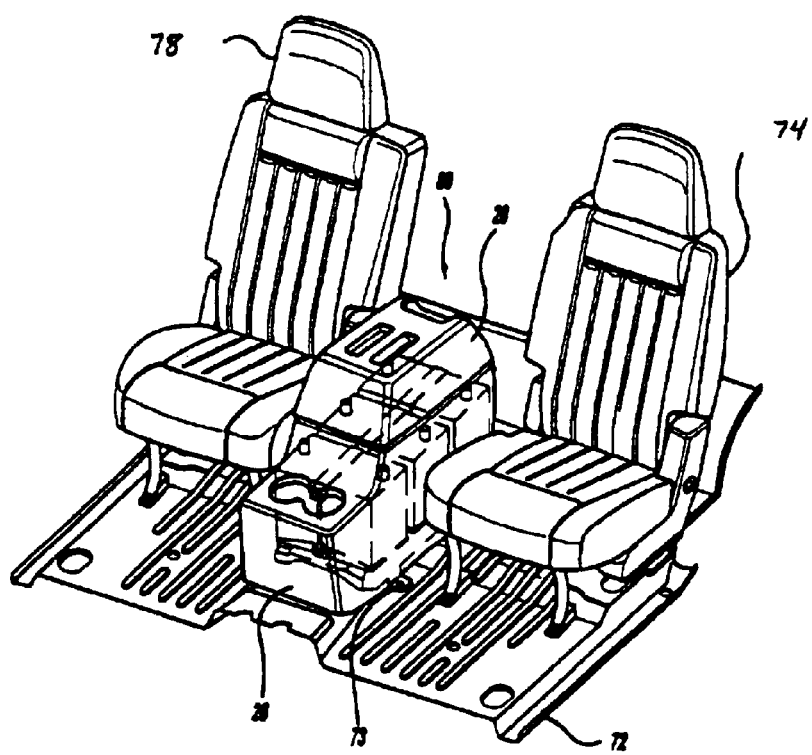
Figure 6:
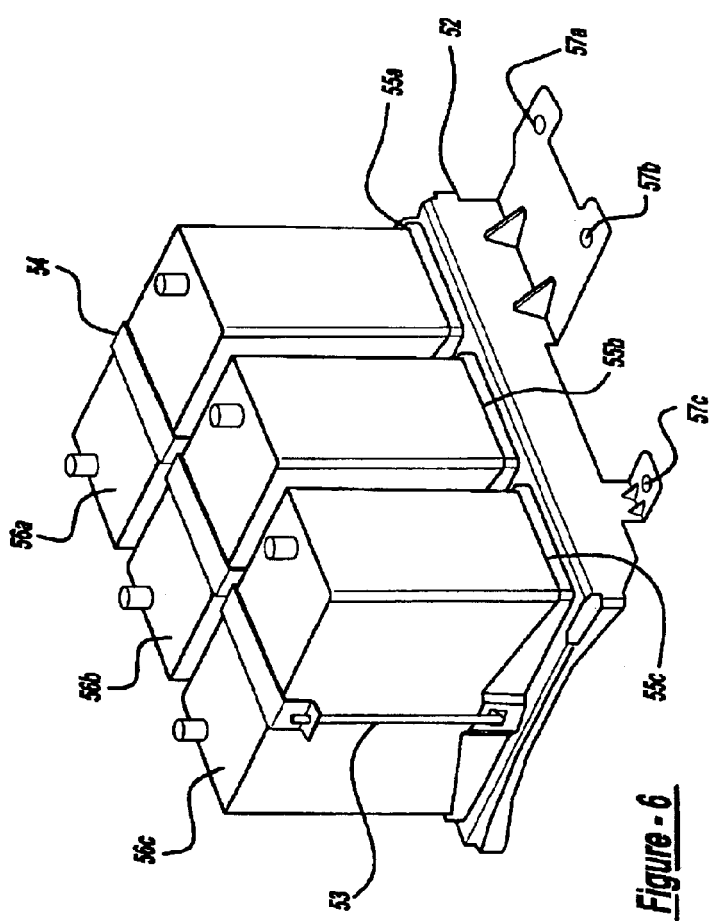
FIG. 6 is a perspective view of the battery units and support structure of FIGS. 5a and 5b.

FIGS. 5a and 5b show the battery units 56a, 56b, 56c and the support structure 52 of FIG. 3 arranged between second row captains' seats 74 and 78 of a sport utility vehicle. The support structure 52, which is described in greater detail below with reference to FIG. 6, is fastened to a vehicle floorpan 72 using conventional center seat hold down fasteners (not shown) and holes 73 (only one shown). Alternatively, a center seat bracket can be used as the support structure for the battery units. As such, a cost savings can be realized when manufacturing and assembling a "baseline" vehicle modified to have an additional, high voltage battery system. The same center seat fasteners, holes, brackets and floorpan designs can be used when manufacturing and assembling, for example, a so-called "hybridized" version of a sport utility vehicle. Brackets 53 and 54 are further provided for securing the battery units 56a 56c to the support structure 56.

As shown in FIG. 5b, battery housing/console structure 26 and console cover 28 are installed to complete battery housing assembly 80. This allows, for example, for the possibility of third row seating in a hybridized sport utility vehicle, while minimizing weight and providing a useful second row center platform.

The battery housing assembly 80 of FIGS. 5a and 5b can also be placed in between third row seats using existing hardware and floorpan designs as described above for a baseline vehicle.

FIG. 6 shows a more detailed perspective view of the battery support structure 52 of FIGS. 5a and 5b. The support structure 52, which preferably mounts to the vehicle floorpan using mounting holes for the second row middle seat, includes three cradle sections 55a through 55c for supporting battery units 56a through 56c. The battery units 56a–56c sit within sections 55a–55c, and are secured into place via brackets 53 and 54. Bracket 53 for example can be designed to hook unto the support structure 52 on one end, and to fasten to bracket 54 on the other. Flanges 57a though 57c are provided for cooperating with the floorpan mounting holes as described above.

FIG. 7 shows an alternative embodiment 82 of a battery support structure having flanges 83a through 83c for cooperating with floorpan 84.

Although the present invention has been described in connection with particular embodiments thereof, it is to be understood that various modifications, alterations and adaptations may be made by those skilled in the art without departing from the spirit and scope of the invention. It is intended that the invention be limited only by the appended claims.

What is claimed:

1. An assembly for housing an electrical energy storage device of a vehicle electrical system, comprising:
    a support structure disposed within a passenger compartment of the vehicle for supporting the electrical energy storage device;
    a combined housing/console structure for concealing, at least partially, said support structure and the electrical energy storage device; and
    a housing cover, having at least one console feature, removably attached to said combined housing/console structure for allowing access to said electrical energy storage device without detachment or disengagement of said support structure from the vehicle, and wherein said housing cover comprises a storage compartment.

2. The assembly according to claim 1, wherein said housing cover comprises at least one ventilation opening.

3. The assembly according to claim 1, wherein said housing cover is completely detachable from said housing/console structure.

4. An assembly for housing an electrical energy storage device of a vehicle electrical system, comprising:
    a support structure disposed within a passenger compartment of the vehicle for supporting the electrical energy storage device;
    a combined housing/console structure for concealing, at least partially, said support structure and the electrical energy storage device; and
    a housing cover, having at least one console feature, removably attached to said combined housing/console structure for allowing access to said electrical energy storage device without detachment or disengagement of said support structure from the vehicle, and wherein said housing cover is fixedly attached to and in cooperation with said housing/console structure on one side such that said housing cover can be lifted and swung off said housing/console structure to form an accessory support structure.

5. The assembly according to claim 1, further comprising means for affixing said housing cover to said combined housing/console structure.

6. A battery housing assembly for an electrically-powered vehicle, comprising:
    a battery support structure disposed within a passenger compartment of an automobile;
    at least one battery unit mounted on said battery support structure, said battery unit being used at least in part as a source of power to propel the vehicle;
    a combined battery housing/console structure for concealing, at least partially, said battery support structure and said battery unit; and
    a housing cover, having at least one console feature, removably attached to said combined housing/console structure for allowing access to said battery unit without detachment or disengagement of said support structure from the vehicle, wherein said housing cover comprises a storage compartment.

7. The battery housing assembly according to claim 6, wherein said housing cover is detachable from said combined battery housing/console structure.

8. A battery housing assembly for an electrically-powered vehicle, comprising:
    a battery support structure disposed within a passenger compartment of an automobile;
    at least one battery unit mounted on said battery support structure, said battery unit being used at least in part as a source of power to propel the vehicle;
    a combined battery housing/console structure for concealing, at least partially, said battery support structure and said battery unit; and
    a housing cover, having at least one console feature, removably attached to said combined housing/console structure for allowing access to said battery unit without detachment or disengagement of said support structure from the vehicle, wherein said housing cover is fixedly attached to and in cooperation with said combined battery housing/console structure on one side such that said housing cover can be lifted and swung off said combined battery housing/console structure to form an accessory support structure.

9. The battery housing assembly according to claim 6, further comprising means for affixing said housing cover to said combined battery housing/console structure.

10. A vehicle having dual battery systems, comprising:
    a battery support structure arranged within a passenger compartment of the vehicle, said battery support structure being disposed between seats inside the passenger compartment;
    at least one battery unit corresponding to one of said battery systems mounted on said battery support structure, said battery unit being used at least in part as a source of power to propel the vehicle;
    a combined battery housing/console structure for concealing, at least partially, said battery support structure and said battery unit; and a housing cover, having at least one console feature removably attached to said combined housing/console structure for allowing access to said battery unit without detachment or disengagement of said support structure from the vehicle.

11. The automobile according to claim 10, wherein said battery support structure is placed between second row seats inside the passenger compartment.

12. The automobile according to claim 10, wherein said battery support structure is placed between third row seats inside the passenger compartment.

13. The vehicle according to claim 10, wherein said battery support structure is placed between first row seats inside the passenger compartment.

14. The vehicle according to claim 10, wherein said battery support structure is placed between intermediate row seats inside the passenger compartment.

15. The vehicle according to claim 10, wherein said battery support structure is placed between rear row seats inside the passenger compartment.

* * * * *